United States Patent [19]

Dosdall et al.

[11] Patent Number: 5,117,681
[45] Date of Patent: Jun. 2, 1992

[54] CORRECTION OF SYSTEMATIC POSITION-SENSING ERRORS IN INTERNAL COMBUSTION ENGINES

[75] Inventors: James M. Dosdall, Grosse Ile; John V. James, Walled Lake, both of Mich.

[73] Assignee: Ford Motor Company, Dearborn, Mich.

[21] Appl. No.: 590,729

[22] Filed: Oct. 1, 1990

[51] Int. Cl.⁵ .......................................... G01M 15/00
[52] U.S. Cl. ...................................................... 73/116
[58] Field of Search .................... 73/117.3, 112, 116

[56] References Cited

U.S. PATENT DOCUMENTS 4,000,403 2/1977 Olsen et al. .......................... 73/116
4,459,968 7/1984 Brandt et al.

OTHER PUBLICATIONS

SAE Paper 870386, James et al, "Microprocessor Based Data Acquisition for Analysis of Engine Performance".

Primary Examiner—Robert Raevis
Attorney, Agent, or Firm—Mark Mollon; Roger L. May

[57] ABSTRACT

Systematic errors in manufacturing of position markers of an internal combustion engine position sensing system are corrected by a procedure which detects nonuniformities in the placement of the position markers using an engine coastdown without combustion in the cylinders. Since the coastdown comprises a smooth deceleration, any nonuniformities detected in the velocities calculated for individual firing intervals during the coastdown are a manifestation of nonuniformities in the position marker placement. These nonuniformities are used to calculate correction factors which are stored for use when calculating velocities during engine combustion.

13 Claims, 3 Drawing Sheets

CORRECTION OF SYSTEMATIC POSITION-SENSING ERRORS IN INTERNAL COMBUSTION ENGINES

BACKGROUND OF THE INVENTION

The present invention relates in general to removing systematic position-sensing errors in an internal combustion engine position sensing system, and more specifically to a procedure to be conducted after assembly of an engine which quantifies any variation of the spacing of position encoding markers from a uniform spacing.

Modern engine control and diagnosis requires accurate, high resolution position sensing as an engine rotates through its engine cycle. For example, copending U.S. Ser. No. 07/572,650, entitled "Misfire Detection In An Internal Combustion Engine", which is incorporated herein by reference, teaches the detection of misfires or failure of one or more cylinders to produce power during its power stroke by detecting very small changes in the velocity (and thus acceleration) of the engine crankshaft. Since the velocity during each velocity measuring (i.e., firing) interval of engine rotation is determined according to the rotational arc $\Delta\theta$ covered by the interval divided by the time $\Delta T$ required to pass through the arc, the measured values for both $\Delta\theta$ and $\Delta T$ must be measured sufficiently accurately to provide the sensitivity required to detect such small velocity changes.

Engine rotational position is monitored using a rotor having vanes, teeth, or slots disposed thereon for interacting with magnetic or optical sensors at predetermined points in the rotation of the engine crankshaft. Thus, in order to determine engine velocity, only values of $\Delta T$ are actually measured. The values of each $\Delta\theta$ are assumed to be known from the rotor design. Furthermore, the arcs throughout the rotation of the rotor are typically uniform (i.e., all $\Delta\theta$'s are equal) so that each calculated velocity equals a constant divided by the measured time $\Delta T$. Any systematic deviation of the actual angles $\Delta\theta$ from the assumed values, such as caused by manufacturing errors, will result in velocities, and hence, accelerations which are in error. If the angular error is sufficiently large, the erroneous values of velocity and acceleration can distort the effects of a misfiring cylinder or can cause an erroneous indication of one or more cylinders as having misfired even when engine operation is in fact smooth (i.e., no power loss in any cylinder).

The foregoing problems can be avoided by manufacturing rotors with position encoding markers which are accurately located in their desired position. However, accuracy to within a few tenth's of a degree or better is typically required, which adds expense to the rotor. Furthermore, it is desirable to perform engine diagnosis using diagnostic equipment attached to older engines which have not been manufactured with high accuracy position encoding rotors.

An alternative to accurate manufacture is to simply measure the resulting separation of position markers which are produced rather than assuming perfect uniformity in their positioning. To measure the separation of position markers by timing their passage past the position sensor in a running engine would require the engine to be running perfectly smoothly. However, since it is not possible to detect whether an engine is running perfectly smoothly without first having accurate position sensing, actual position values $\Delta\theta$ cannot be determined. It would also be impractical to physically measure the dimensions of a rotor prior to engine assembly because that would require extra manufacturing steps to keep track of the rotor dimensions so that they could be stored electonically within the engine controller, which is manufactured separately from the engine.

SUMMARY OF THE INVENTION

Accordingly, it is a principal object of the present invention to provide a method and apparatus for determining the angular spacing between position markers on an encoding rotor which can be performed after engine assembly using simple procedures.

It is a further object of the present invention to correct for position-related errors in velocity and acceleration measurements made in internal combustion engines.

The present invention achieves error correction by measuring time between the passage of position markers during rotation of an engine. Since most nonuniformity of engine rotation during normal engine operation is caused by combustions events, the present invention performs measurements with combustion inhibited. After accelerating an engine to high speed and completely shutting off fuel to the engine (e.g., turning off the fuel injectors), the engine decelerates smoothly (absent any major malfunctions such as extreme nonuniformities of cylinder compression). Although the engine velocity is not constant during such a coastdown, it is sufficiently smooth that there is no substantial cylinder-specific deviation of the deceleration from the overall deceleration of the engine. Any deviations from uniformity which do appear in the calculated velocities during coastdown are manifestations of an encoder nonuniformity and serve to provide a quantitative measure of the encoder nonuniformity.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION OF PREFERRED EMBODIMENTS

Figure 1:
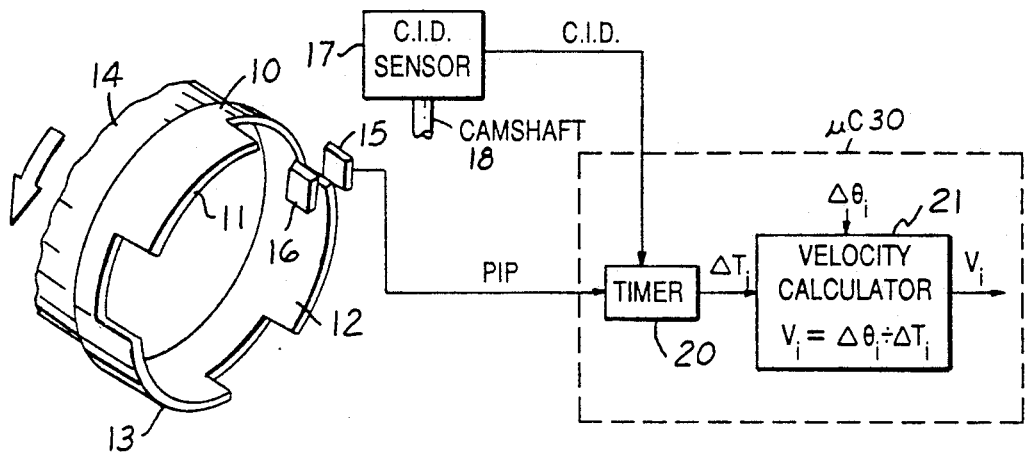
FIG. 1 illustrates one embodiment for a position sensing and velocity measuring system useful in the present invention.

The engine rotation position sensing system of FIG. 1 includes a rotor 10 including vanes 11, 12, and 13 which rotate with a crankshaft 14 (a three-vane rotor from a six-cylinder engine is shown in this example). The vanes pass between a hall-effect sensor 15 and a permanent magnet 16 to generate a profile ignition pulse (PIP) signal as the crankshaft rotates. Vanes 11–13 are typically arranged to generate a rising edge in the PIP signal just before top dead center of each respective cylinder. The rising edge in the PIP signal actually indicates the approach to top dead center of two engine cylinders, one of which is approaching a power stroke and one of which is approaching an intake stroke since it takes two full crankshaft rotations to complete an engine cycle.

A cylinder identification (CID) sensor 17 is connected to a camshaft 18 for identifying which of the two cylinders is actually on its power stroke. Since camshaft 18 rotates once for every two rotations of crankshaft 14, a CID signal is prefereably generated having a rising edge corresponding to the power stroke of cylinder No. 1.

A timer 20 receives the PIP signal and the CID signal and measures elapsed time between predetermined engine position locations as determined by the PIP and CID signals. The elapsed time $\Delta T_i$ for each velocity measuring interval i is output from timer 20 to a velocity calculator 21 where the assumed angular spacing $\Delta\theta_i$ is divided by time $\Delta T_i$ to provide the velocity value $V_i$.

Figure 2:
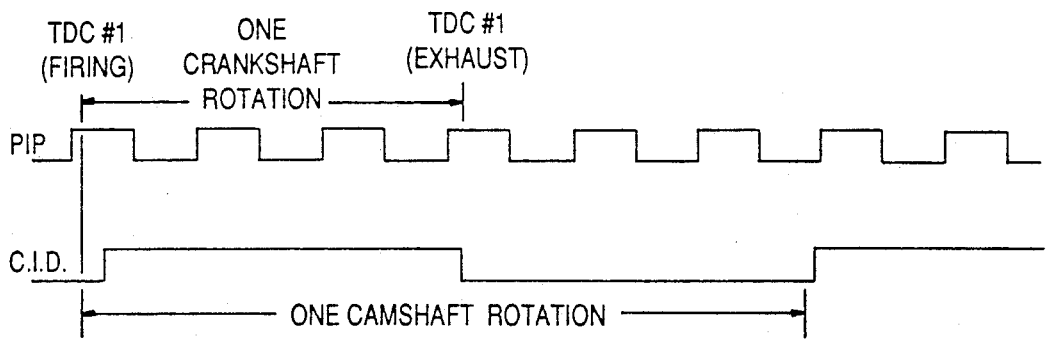
FIG. 2 is a waveform diagram showing position signals from the system in FIG. 1.

FIG. 2 shows waveforms for the PIP signal and the CID signal in relation to the occurrence of top dead center of cylinder No. 1. Thus, the PIP signal is a square-wave signal having 50% duty cycle and having a rising edge or positive transition just prior to (e.g., 10° before) top dead center of each cylinder. The CID signal is also a 50% duty-cyclke square wave which has a rising edge just after top dead center of the power stroke of cylinder No. 1. It will be apparent to those skilled in the art that the transitions in the PIP and CID signals could be made to occur at any known angular positions.

Figure 3:
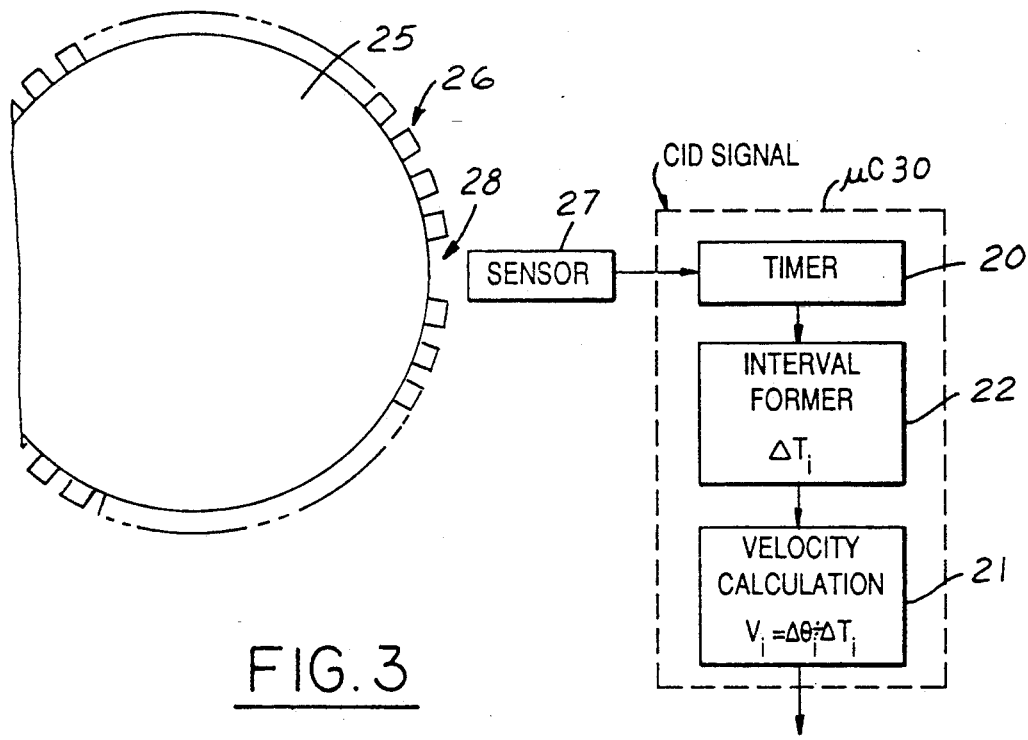
FIG. 3 illustrates an alternative embodiment for a position sensing and velocity measuring system.

An alternative embodiment of position sensing apparatus is shown in FIG. 3. A multi-toothed wheel 25 is mounted on an engine for rotation with the crankshaft. A plurality of teeth 26 are disposed along the periphery of wheel 25 at a predetermined angular spacing. A sensor 27 is disposed in a fixed location closely spaced to teeth 26 for sensing when each tooth passes sensor 27. For example, sensor 27 may be comprised of a variable reluctance sensor to sense the passage of teeth 26 made of magnetically permeable material.

A missing tooth location 28 is provided on wheel 25 to establish an absolute location reference, e.g., at 90° before top dead center of cylinder No. 1, as shown in FIG. 3.

Sensor 27 is connected to timer 20 and velocity calculator 21 as described with reference to FIG. 1. However, since the velocity measuring intervals in this embodiment are longer than the spacing of teeth 26, an interval former 22 is disposed between timer 20 and velocity calculator 21 in order to provide the sum of the measured time periods for the consecutive teeth which are included in the particular velocity interval i to be measured. As shown in FIGS. 1 and 3, timer 20, velocity calculator 21, and interval former 22 may preferably be comprised or implemented in a programmed microcontroller 30.

Figure 4:
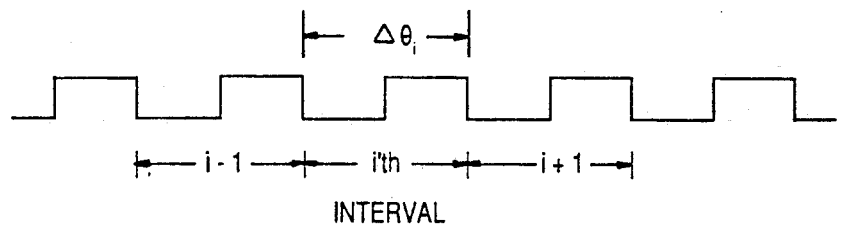
FIG. 4 is a waveform diagram illustrating intervals of crankshaft rotation over actual angular spacing of position marker signals.

FIG. 4 illustrates one preferred arrangement of a PIP signal divided into consecutive time intervals $\Delta T_i$. Each rising edge of the PIP signal may correspond for example, to at or near top dead center of a respective cylinder Each interval begins at the falling edge prior to top dead center and ends at the falling edge following top dead center, as is described in copending application, Ser. No. 07/572,282 entitled "Selection of Velocity Interval for Power Stroke Acceleration Measurements" which is incorporated herein by reference. Thus, an i'th interval has a measured elapsed time $\Delta T_i$ and has an angular size from falling edge to falling edge of the PIP signal designated $\Delta\theta_i$ corresponding to the actual spacing between the position markers of the rotor. The assumed spacing, as intended by the design of the system, is designated $\Delta\theta_0$. Thus, a velocity measurement is determined by dividing $\Delta\theta_0$ by $\Delta T_i$. The velocity result is thus in error by the ratio of the actual spacing $\Delta\theta_i$ to the assumed spacing $\Delta\theta_0$.

The difference between the actual and assumed spacings between position markers creates a systematic error that produces false velocity differences between successive intervals which become superimposed on the effects of genuine differences between successive combustion events. Such systematic errors reduce the reliability of misfire detection based on velocity fluctuations of the engine.

According to the present invention, it is realized that the nonuniformities in the position marker spacing on the rotating wheel can be measured and compensated for using time interval measurements $\Delta T_i$ taken when an engine is running smoothly. Since most nonuniformity of engine operation is related to the combustion process in the respective cylinders, the engine is rotated without the occurrence of combustion in order to obtain the necessary smooth operation. Interval timing data which is accumulated during smooth engine operation is employed to factor out the systematic errors in later velocity calculations made during operation with combustion.

Figure 5:
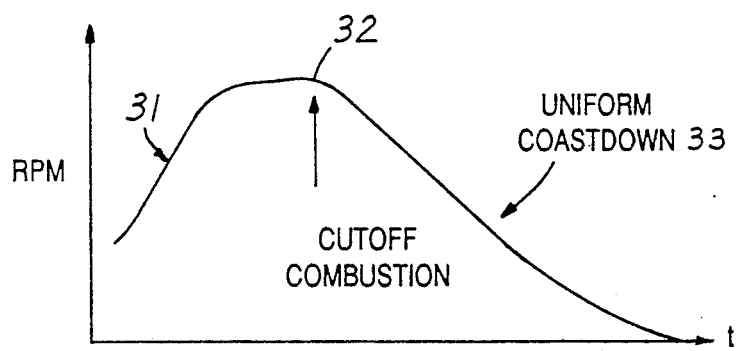
FIG. 5 is a plot showing engine rpm during a test procedure for determining correction factors according to the present invention.

In a preferred embodiment, the engine is accelerated to high speed and then fuel is completely shut off to the engine (e.g., by closing the fuel injectors) resulting in a smooth engine deceleration (except when a serious malfunction exists such as a compression loss). This procedure is illustrated in FIG. 5 where engine rpm increases during an initial acceleration period 31. Fuel is cut off at a cutoff point 32 and follows a substantially uniform coastdown period 33. For example, microcontroller 30 is instructed to begin an error measurement routine by means of a user supplied control signal and may be performed as an end-of-line manufacturing procedure at an assembly plant or by a technician during vehicle servicing. The operator then depresses the throttle to accelerate the engine along the acceleration portion of the curve 31. When a predetermined speed is reached at point 32, microcontroller 30 cuts off the flow of fuel to the engine resulting in the coastdown 33. When the operator hears the decline in engine speed he would preferably release the throttle, since perturbations in engine speed resulting from different compression among cylinders are much less at closed throttle than at open throttle. In fact, comparing coastdown data obtained during open throttle and during closed throttle can be employed to detect compression nonuniformities.

Alternatively, smooth engine rotation can possibly be obtained by externally driving the engine, such as with the starter motor, with fuel cut-off.

Although the velocity is not constant during the coastdown, it is smooth in that there will not be substantial cylinder-specific deviations of deceleration from the grosser overall rate of deceleration, except as noted above. Deviations which do appear in the calculated velocities during smooth rotation are manifestations of nonuniformity in the spacing of position markers on the encoder wheel and in fact serve as a quantitative measure of the nonuniformity.

Figure 6:
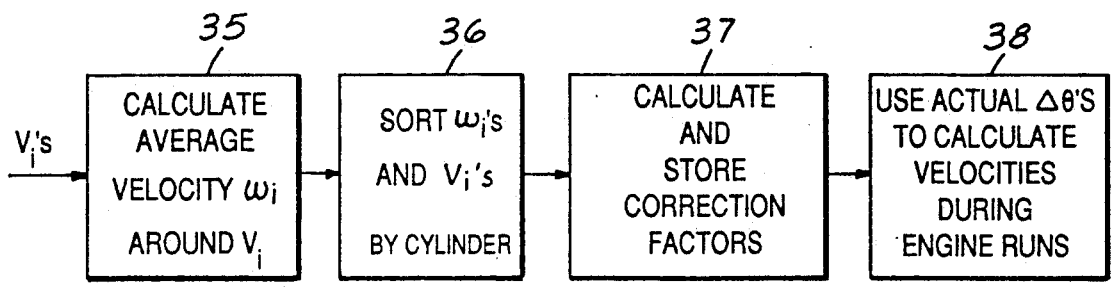
FIG. 6 illustrates apparatus for finding correction factors according to one embodiment of the present invention.

FIG. 6 illustrates additional steps conducted by microcontroller 30 to determine and remove the nonuniformities. The calculated velocities $V_i$ are input to a block 35 where an average velocity $\omega_i$ is calculated corresponding to but over a longer period than each respective velocity measurement $V_i$. The average velocity $\omega_i$ preferably is measured over an integral number of engine rotations since the angular position between one occurrence of a position marker and the next occurrence of that same position marker equals 360° without error. Thus, an average velocity is known during that full rotation or rotations. If the shorter velocity interval $V_i$ is substantially centered in the, longer interval and the coastdown is uniform, then it is substantially equal to the longer-term average velocity.

In block 36, the results for $\omega_i$ and $V_i$ are sorted by cylinder number. By taking measurements and performing calculations for a plurality of full engine rotations and combining the results, random noise effects are minimized. In step 37, correction factors are calculated and stored for use in calculating velocities during engine runtime using actual position marker spacing in step 38.

In a first preferred embodiment for calculating correction factors for the velocity measurements, a single term correction factor for each cylinder is derived as a simple average of the ratios of average velocity $\omega_i$ to the individual interval velocity $V_i$. More specifically, let $V_i$ equal the initial (uncorrected) velocity $\Delta\theta_0/\Delta T_i$ computed for each firing of the subject cylinder while in the unfueled, coastdown mode. $\omega_i$ is the average velocity surrounding each firing computed over an interval of preferably one crank revolution before and one crank revolution after the subject firing. Let N equal the number of data points being averaged together for a particular cylinder number during the coastdown mode. Finally, let $V'_i$ equal the corrected velocity for a particular firing interval. In the single term embodiment, the corrected velocity is defined as $$V'_i = C_l * V_i.$$

The correction coefficient $C_1$ is chosen so that $$C_1 = \frac{\Delta\theta_i}{\Delta\theta_0}$$

Therefore, the corrected velocity $V'_i$ is found as follows:

$$V'_i = C_1 * V_i = \frac{\Delta\theta_i}{\Delta\theta_0} * \frac{\Delta\theta_0}{\Delta T_i} = \frac{\Delta\theta_i}{\Delta T_i}$$

Thus, the corrected velocity $V'_i$ is the true velocity over the i'th interval.

The $\Delta\theta_i$ for each cylinder is not directly known, but by assuming that the cycle-averaged velocity $\omega_i$ is a substantially accurate estimate of the true velocity under these special conditions, the $C_l$ coefficients can be determined from the coastdown data as follows:

$$C_1 = \frac{1}{N} \sum_{i=1}^{N} \frac{\omega_i}{V_i}$$

An alternate method of deriving $C_l$ from the N data points is to perform a least squares fit of the corrected velocities to the cycle-averaged velocities. In other words, choose $C_l$ so as to minimize the S defined as:

$$S = \sum_{i=1}^{N} (V'_i - \omega_i)^2 = \sum_{i=1}^{N} (C_l V_i - \omega_i)^2$$

Well known techniques for setting $\partial S/\partial C_1$ equal to zero yield the alternative formula for $C_1$:

$$C_1 = \frac{\sum_{i=1}^{N} \omega_i V_i}{\sum_{i=1}^{N} (V_i)^2}$$

The first method for finding $C_1$ is in fact equivalent to a least squares fit of the relative velocity difference, as is defined by:

$$S = \sum_{i=1}^{N} \left( \frac{V'_i - \omega_i}{V_i} \right)^2 = \sum_{i=1}^{N} \left( \frac{C_1 V_i - \omega_i}{V_i} \right)^2$$

Both methods yield similar results, although the second method is more heavily weighted to data from the high speed portion of the coastdown curve.

At higher speeds and throttle settings during actual engine operation, accurate velocity correction may require the inclusion in the determination of correction factors of some speed-dependent effects present during the original coastdown procedure. Thus, in another alternative embodiment of the invention, a polynomial correction is used which takes the form of $$V'_i = C_0 + C_1 * V_i + C_2 * (V_i)^2 + \ldots$$

where the coefficients $C_0$, $C_l$, $C_2$, etc., are similarly determined by applying least squares fit to the coastdown velocity profile.

The foregoing equations are applied to data for each cylinder to derive separate correction factors to be applied to measurements obtained corresponding to each cylinder or pair of cylinders identified by the firing interval between PIP signals. The correction factors may be preferably stored in an electrically programmable memory in association with an electronic engine controller for storage and use during operation of an engine.

Figure 7A:
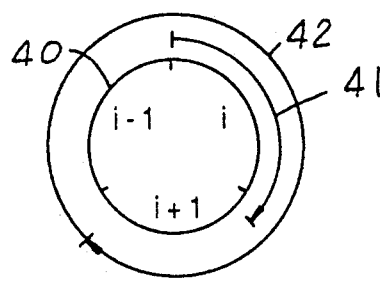
FIGS. 7A and 7B illustrate one embodiment of the method of the present invention for determining the nonuniformities present in an individual rotation interval.
Figure 7B:
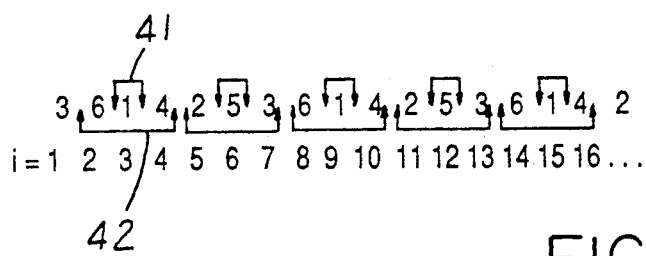

In the foregoing embodiment employing a uniform coastdown in engine velocity, it is desirable to obtain a particular interrelationship between the cycle-averaged velocity $\omega_i$ and the individual velocity $V_i$. In FIG. 7A, a circle 40 represents an position rotor in a six-cylinder engine having three PIP intervals (i.e., position markers) $i-1$, $i$, and $i+1$, in one full 360° rotation of the engine. A measured interval 41 is obtained over the i'th PIP interval and a longer time interval 42 is measured over the 360° rotation which is centered on the individual i'th interval, i.e., from $i-1$ through $i+1$. This is further illustrated in FIG. 7B, showing the firing order of a six-cylinder engine corresponding to the several PIP intervals. In this example, the i'th PIP interval 41 corresponds to the firing interval of cylinder No. 1 where $i=3$. The average velocity is determined over one 360° rotation or three consecutive PIP intervals where i equals 2, 3, and 4 corresponding to the firing of cylinders 6, 1, and 4. These values are sorted together with the results of other measurements corresponding to other firing intervals of cylinder No. 5 and cylinder No. 1 and their corresponding average velocities.

Figure 8A:
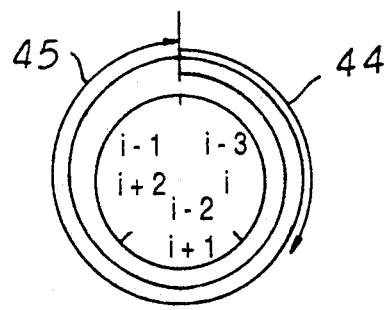
FIGS. 8A and 8B illustrate an alternative method similar to FIGS. 7A and 7B.
Figure 8B:
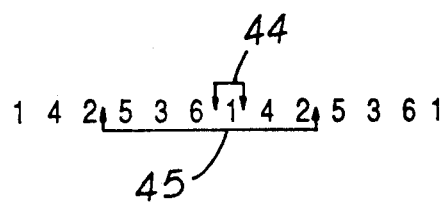

Alternatively, average velocity $\omega_i$ can be determined as shown in FIG. 8A where a velocity $V_i$ is determined over an interval 44. The corresponding average velocity $\omega_i$ is measured over an interval 45 which includes individual intervals from $i-3$ to $i+2$. As shown in FIG. 8B, this embodiment uses all firings across the engine cycle (i.e., two rotations of the engine) and includes a power stroke corresponding to each of the engine cylinders.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method for determining angular spacing corresponding to individual rotation intervals between respective predetermined points disposed on an encoder wheel driven by an internal combustion engine, said method comprising the steps of:

detecting passage of said predetermined points past a fixed location to provide a position signal at each point;

causing said engine to rotate without any combustion;

measuring the time which elapses between each consecutive pair of said position signals;

selecting a rotation interval between two of said predetermined points;

determining a total elapsed time for at least one full 360° rotation of said encoder wheel including said selected rotation interval; and comparing said total elapsed time with a measured time corresponding to said selected rotation interval.

2. The method of claim 1 wherein said measured time corresponding to said selected rotation interval is substantially at the center of said total elapsed time.

3. The method of claim 1 wherein said engine rotating step comprises:

accelerating said engine to a high speed under its own power; and cutting off fuel flow to said engine to cause a coastdown in engine speed without combustion.

4. The method of claim 3 further comprising the steps of:

repeating said determining and comparing steps for said selected rotation interval during other total elapsed time periods; and combining said comparisons to derive a ratio between the actual spacing of said selected rotation interval and its assumed spacing.

5. The method of claim 1 further comprising the steps of:

repeating said determining and comparing steps for said selected rotation interval during other total elapsed time periods; and combining said comparisons to derive a ratio between the actual spacing of said selected rotation interval and its assumed spacing.

6. The method of claim 4 wherein said combining step includes determination of an average of said comparisons.

7. The method of claim 5 wherein said combining step comprises a least squares fit of velocity calculated over said measured time and velocity calculated over said total elapsed time.

8. A method for correcting velocity measurements for a combustion engine having a position sensing system subject to systematic errors in sensing individual intervals between predetermined rotational positions of said engine, said method comprising the steps of:

establishing engine rotation at a velocity greater than or equal to a predetermined velocity;

coasting down said engine rotation while combustion is prevented in said engine;

measuring velocity for individual intervals during said coastdown to obtain measurements containing said systematic errors;

computing an average velocity centered on a selected individual interval over a longer interval comprising an integral number of full 360° rotation(s) of said engine; and comparing said average velocity with said measured velocity for said selected individual interval to provide a correction factor for said selected individual interval.

9. The method of claim 8 wherein said coasting down is comprised of stopping fuel flow to said engine.

10. The method of claim 8 wherein said individual velocity measurements are obtained for a plurality of full rotations of said engine, said method further comprising the steps of:

computing an average velocity substantially centered on each respective individual interval during each full engine rotation; and sorting said individual velocity measurements and said average velocities according to each respective individual interval for comparison to provide correction factors for each respective individual interval.

11. The method of claim 8 further comprising the steps of:

measuring velocity for individual intervals during combustion operation of said engine; and multiplying measured velocities corresponding to said selected individual interval by said correction factor.

12. The method of claim 11 wherein a corrected velocity $V'_i$ is given by the formula $V'_i = C_1 * V_i$, where $C_1$ is said correction factor and $V_i$ is the uncorrected measured velocity, and wherein $C_1$ is determined by the formula:

$$C_1 = \frac{1}{N} \sum_{i=1}^{N} \frac{\omega_i}{V_i}$$

where N is the number of individual calculations being averaged, i is an integer from 1 to N, $V_i$ is the uncorrected velocity from the ith rotation, and $\omega_i$ is average velocity centered on $V_i$.

13. The method of claim 11 wherein a corrected velocity $V'_i$ is given by the formula $V'_i = C_1 * V_i$, where $C_1$ is said correction factor and $V_i$ is the uncorrected measured velocity, and wherein $C_1$ is determined by the formula:

$$C_1 = \frac{\sum_{i=1}^{N} \omega_i V_i}{\sum_{i=1}^{N} (V_i)^2}$$

where N is the number of individual calculations being averaged, i is an integer from 1 to N, $V_i$ is the uncorrected velocity from the ith rotation, and $\omega_i$ is average velocity centered on $V_i$.

* * * * *